US009959490B2

(12) United States Patent  
Gelphman (10) Patent No.: US 9,959,490 B2  
(45) Date of Patent: *May 1, 2018

(54) PRINT ORIENTATION OF DOCUMENTS BASED ON DEVICE SENSOR OUTPUT

(71) Applicant: APPLE INC., Cupertino, CA (US)

(72) Inventor: David Gelphman, Aptos, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/470,838

(22) Filed: Mar. 27, 2017

(65) Prior Publication Data

US 2017/0200070 A1 Jul. 13, 2017

Related U.S. Application Data

(63) Continuation of application No. 12/722,445, filed on Mar. 11, 2010, now Pat. No. 9,639,787.

(51) Int. Cl.
*G06K 15/00* (2006.01)
*G06K 15/02* (2006.01)
*G06F 3/12* (2006.01)

(52) U.S. Cl.
CPC ....... *G06K 15/1807* (2013.01); *G06F 3/1204* (2013.01); *G06F 3/1205* (2013.01); *G06F 3/1243* (2013.01); *G06F 3/1247* (2013.01); *G06F 3/1253* (2013.01); *G06K 15/00* (2013.01)

(58) Field of Classification Search
CPC . G06K 15/1807; G06F 3/1204; G06F 3/1205; G06F 3/1243

USPC ......................................................... 358/1.12
See application file for complete search history.

(56) References Cited

U.S. PATENT DOCUMENTS

| | | | |
|---|---|---|---|
| 5,030,944 A | 7/1991 | Masimo et al. | |
| 5,329,289 A * | 7/1994 | Sakamoto | G06F 1/16 248/922 |
| 6,335,795 B1 * | 1/2002 | Neuhard | G06F 3/1205 358/1.15 |
| 6,952,284 B2 | 10/2005 | Andrews et al. | |
| 7,146,179 B2 | 12/2006 | Parulski et al. | |
| 7,221,909 B2 | 5/2007 | Kiyose | |
| 7,466,442 B2 | 12/2008 | Chapman | |
| 7,532,245 B2 | 5/2009 | Suzuki | |
| 7,595,904 B2 | 9/2009 | Lapstun et al. | |
| 2004/0085573 A1 | 5/2004 | Aidinejad | |
| 2004/0252318 A1 | 12/2004 | Kuroda et al. | |
| 2005/0111042 A1 | 5/2005 | Ogiwara | |

(Continued)

*Primary Examiner* — Neil R McLean
(74) *Attorney, Agent, or Firm* — Invoke (57) ABSTRACT

This is directed to defining the orientation in which a document is printed from the orientation of the device on which the document is displayed. In particular, some electronic devices can have limited user interfaces that do not provide for a simple or elegant interface for defining print settings. To overcome limitations in a displayed user interface, the orientation of an electronic device can be used to define the print orientation of a displayed document. In particular, a motion-sensing component of an electronic device can determine whether the electronic device display is in a portrait or landscape orientation, and define the page orientation of the displayed document to match the determined device orientation. The electronic device can then send information representing the displayed document in the defined page orientation to the printer system.

18 Claims, 5 Drawing Sheets

(56) References Cited

U.S. PATENT DOCUMENTS

2008/0021933 A1     1/2008   Ono
2009/0164894 A1*   6/2009   Takekawa ........... G06F 3/04845
                                                                                                         715/274

* cited by examiner

PRINT ORIENTATION OF DOCUMENTS BASED ON DEVICE SENSOR OUTPUT

CROSS-REFERENCE TO RELATED APPLICATION

This application is a continuation of U.S. application Ser. No. 12/722,445, filed Mar. 11, 2010, the content of which is incorporated herein by reference in its entirety.

FIELD OF THE INVENTION

This is directed to controlling the orientation in which a document is printed based on the output of an electronic device providing the document to a printer. In particular, this is directed to associating the orientation of the electronic device with the orientation of the printed document.

BACKGROUND OF THE INVENTION

Using an electronic device, a user can create, edit, and view different types of documents. For example, a user can create, edit or view text documents, presentations, spreadsheets, images (e.g., photos), web pages, or other documents combining one or both of graphics or images and text. The documents can be displayed on the electronic device display (e.g., a screen or projector), and content of the documents can be manipulated using one or more interfaces of the device (e.g., a keyboard, mouse, or touch-sensitive surface) in combination with functions or features of applications providing the documents. In some cases, however, a user may wish to print hard copy (e.g., on paper) of the document (e.g., to edit a printed text document using a writing instrument, or to share a hard copy of a photograph).

The user can direct an electronic device to print a document using many approaches. In particular, the electronic device can identify and select a printer for the document (e.g., receive a user selection from a pull down menu), and define one or more settings for the print job. The settings can include, for example, the number of copies to print, a page range, color settings, layout, and page orientation. Each of the options can be provided in one or more print setting pages, and can be selected and modified using one or more radio buttons, text entry fields, selectable menus, or combinations of these. In devices having small displays, however, it may be difficult to navigate menus for defining the print settings. In addition, in devices having limited input interfaces, it may be difficult to define a graphical user interface to display that easily allows a user to define print settings.

SUMMARY OF THE INVENTION

This is directed to systems, methods and computer-readable media for controlling the page orientation of printed documents using sensor outputs of an electronic device. In particular, this is directed to correlating the page orientation of documents with the orientation of an electronic device, as determined from the output of motion sensing components within the device.

Some electronic devices can include reduced or limited user interfaces. For example, some electronic devices can be sized to fit in a user's pocket, and therefore include an interface within that dimensional requirement. As another example, some electronic devices can be larger, but have one or more input interfaces that allow a limited number of inputs from a user (e.g., a larger display, but the interface for selecting items on the display requires a larger pointing mechanism). In one implementation, the electronic device can include a touch surface (e.g., a touch screen) on which a user's finger can serve to provide inputs. This approach, however, may define a minimum size for displayed interface elements, as a user's finger may be too large to select small displayed options.

Some electronic device operations, such as printing, can include settings or options that are too numerous to be properly incorporated as part of a single interface of a limited size. To allow a user to define one or more printing settings without requiring a displayed option to be selected using the input interface (e.g., defining the printing setting without providing a touch input), the electronic device can correlate specific attributes of the electronic device position or orientation with the printing setting. In one implementation, the printing orientation of a document (e.g., portrait or landscape layout) can be selected to match the orientation in which the device is held (e.g., portrait or landscape relative to the display).

The electronic device can provide the printing orientation (e.g., the page orientation) to use for printing a document to a printer system using any suitable approach. In some embodiments, the electronic device can transmit metadata along with the document to the printer system, where the metadata defines printing settings, including the document orientation. In some embodiments, however, the electronic device can instead or in addition adjust the page orientation of the document to match the device orientation, and transmit the document in the adjusted page orientation to the printer system. For example, the electronic device can define a representation of the electronic device using a page description language, where the representation is provided in the adjusted orientation.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to an electronic device providing print settings to a printer system based on the output of a motion sensing component of the device. In particular, this is directed to defining the page orientation of a printed document based on the orientation of the device.

Figure 1:
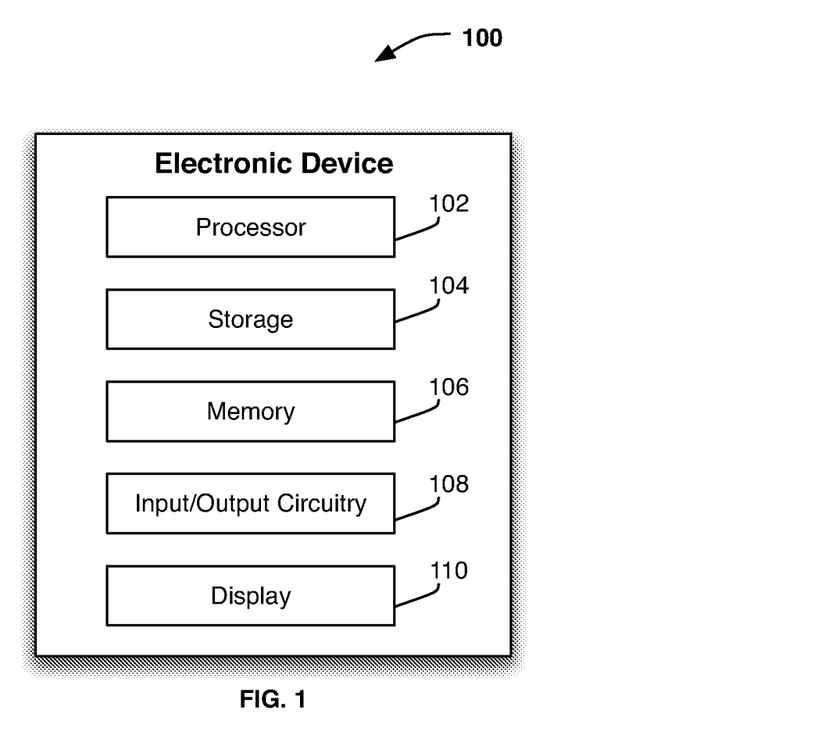
FIG. 1 is a schematic view of an illustrative electronic device for displaying content to be printed in accordance with one embodiment of the invention.

FIG. 1 is a schematic view of an illustrative electronic device for displaying content to be printed in accordance with one embodiment of the invention.

Electronic device 100 can include any suitable type of electronic device operative to display information to a user. For example, electronic device 100 can include a media player such as an iPod° available by Apple Inc., of Cupertino, Calif. a cellular telephone, a personal e-mail or messaging device (e.g., a Blackberry° or a) Sidekick°, an iPhone° available from Apple Inc., pocket-sized personal computers, personal digital assistants (PDAs), a laptop computer, a music recorder, a video recorder, a gaming device, a camera, radios, medical equipment, and any other portable electronic device having a display from which a user can select a portion of displayed objects.

Electronic device 100 can include a processor or control circuitry 102, storage 104, memory 106, input/output circuitry 108, and display 110 as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., communications circuitry or positioning circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. Storage 104 can include, for example, one or more storage mediums including a harddrive, solid state drive, flash memory, permanent memory such as ROM, any other suitable type of storage component, or any combination thereof. Memory 106 can include cache memory, semi-permanent memory such as RAM, and/or one or more different types of memory used for temporarily storing data. In some embodiments, memory 106 and storage 104 can be combined as a single storage medium. Input/output circuitry 108 can be operative to convert (and encode/decode, if necessary) analog signals and other signals into digital data. Input/output circuitry 108 can be coupled to or include any suitable input interface, such as for example, a button, keypad, dial, a click wheel, or a touch screen, as well as any suitable output circuitry associated with output devices (e.g., audio outputs or display circuitry or components). In some embodiments, input/output circuitry 108 can enable a communications path between electronic device 100 and a printer system (e.g., a printer). The communications path can include, for example a wired path (e.g., a USB cable) or a wireless path (e.g., a path provided by communications circuitry of the device and of the printer system).

Display 110 can be operatively coupled to control circuitry 102 for providing visual outputs to a user. Display 110 can include any suitable type of display, including for example a liquid crystal display (LCD) (e.g., active matrix, passive matrix and the like), a monochrome display, color graphics adapter (CGA) display, enhanced graphics adapter (EGA) display, variable-graphics-array (VGA) display, super VGA display, cathode ray tube (CRT), a plasma display, a display implemented with electronic inks, or any other suitable display. Display 110 can be configured to display a graphical user interface that can provide an easy to use interface between a user of the computer system and the operating system or application running on the system.

In some embodiments, electronic device 100 can include a bus operative to provide a data transfer path for transferring data to, from, or between control processor 102, storage 104, memory 106, input/output circuitry 108, display 110 and any other component included in the electronic device.

Using an electronic device, a user can generate, edit, revise or view documents. For example, a user can direct the electronic device to load a document creating and editing application, such as a word processing application, a spreadsheet application, or a photo capturing application. Using the application, the user can create or capture a new document. For example, the user can use an input interface to enter text or formulas for a text document or spreadsheet. As another example, the user can direct a camera or other sensor of the device to capture one or more frames depicting the environment of the device. The electronic device can store generated or captured documents using storage of the device.

In some embodiments, the user can edit existing documents using applications of the electronic device. For example, the electronic device can load an application that can be used to open a text document or a spreadsheet. As another example, an electronic device can be used to open a media editing (e.g., photo or video editing) application. The user can generate, edit or view any suitable type of document. For example, the electronic device can provide access to text documents, spreadsheets, web pages, portable documents (e.g., PDF documents), media documents (e.g., photos or videos), or other content including text, graphics or both that is contained within a file. In some embodiments, the document can have boundaries shown on the display (e.g., boundaries corresponding to a piece of paper).

A user can provide a document generated on a first device to one or more other devices for viewing or further editing. For example, a user can share a document with other users having electronic devices by transmitting the document to a remote source (e.g., a cloud or server) from which the other users can access the document. Alternatively or in addition, the electronic device can transmit a copy of the document to the other devices (e.g., send a photograph by email).

Figure 2:
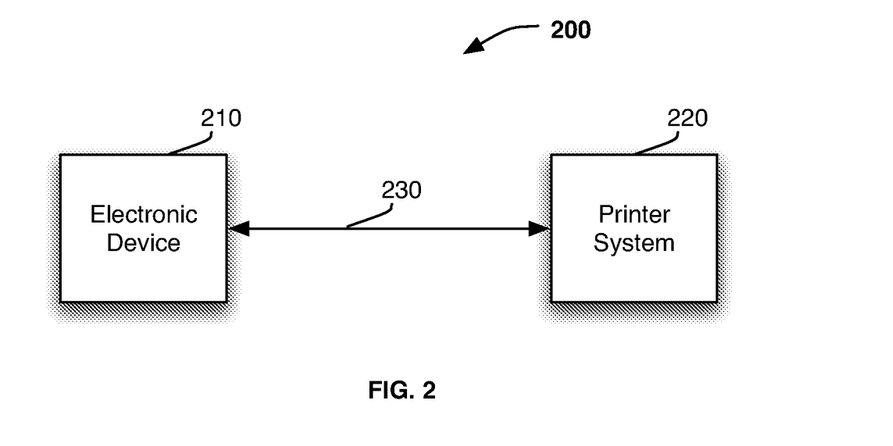
FIG. 2 is a schematic view of an illustrative device and printer system in accordance with one embodiment of the invention.

In some cases, however, a user may wish to view a copy of the document outside of the electronic device. To do so, the user can direct the electronic device to print the document. FIG. 2 is a schematic view of an illustrative device and printer system in accordance with one embodiment of the invention. System 200 can include device 210 and printer system 220. Device 210 can include any suitable electronic device, including for example an electronic device having some or all of the features of electronic device 100 (FIG. 1). Printer system 220 can include any suitable device or apparatus operative to construct a physical representation of an electronic document (e.g., electronic data) that the user can use outside of the electronic device. In particular, printer system 220 can include, for example, a laser printer, inkjet printer, thermal printer, dot matrix printer, plotter, facsimile machine, copying machine, or combinations of these. Printer system 220 can provide an output in one or more colors, including for example a monochromic output or an output combining ink of several colors (e.g., cyan, magenta, yellow and black ink). The output can be provided on any suitable base, including for example paper of one or more colors, wood, plastic, metal, or any other surface on which ink or color can be overlaid. In some embodiments, the output of printer system 220 can be overlaid on previous outputs to form a three dimensional object (e.g., the ink of the printer forms a layer of a three dimensional object).

The electronic device can provide the information to print to the printer system using any suitable approach. In some embodiments, communications path 230 can be established between electronic device 210 and printer system 220. Communications path 230 can include any suitable wired or wireless communications path (or combinations of these), and can transfer data encoded using any suitable protocol. In some embodiments, communications path 230 can include circuitry for encoding, decoding, or modifying the information transmitted between the electronic device and the printer system.

Communications path 230 can connect to each of device 210 and printer system 220 using any suitable interface or connector. For example, communications path 230 can include a cable having connectors (e.g., USB connectors or Ethernet connectors) that connect to counterpart connector ports in each of the device and printer system. As another example, the electronic device and printer system can include communications circuitry for connecting to a communications network supporting the communications path. The electronic device and printer system can connect to any suitable communications protocol or communications network using appropriate communications circuitry, including for example communications circuitry supporting Wi-Fi (e.g., TM a 802.11 protocol), Ethernet, Bluetooth (which is a 20 trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination of these.

Figures 3, 4:
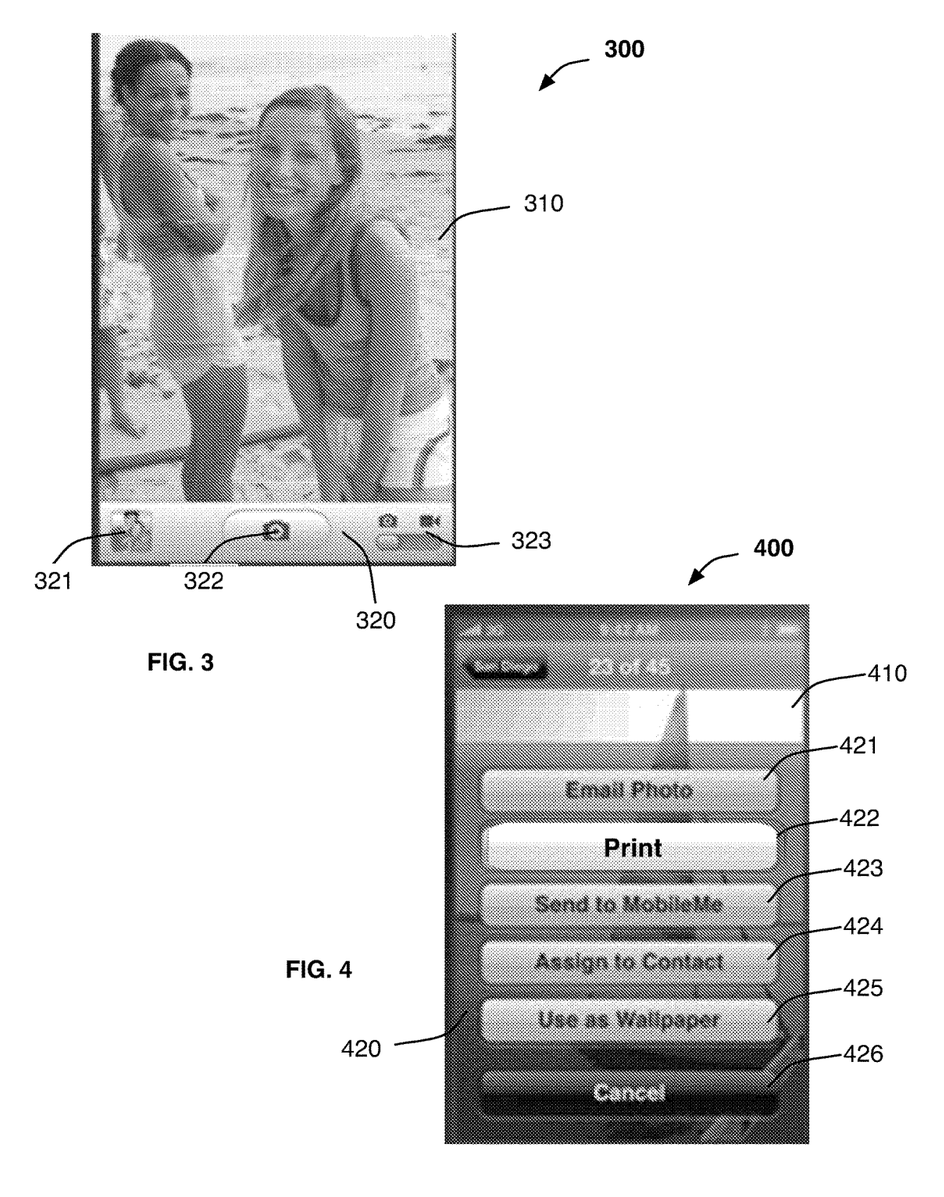
FIG. 3 is a schematic view of an illustrative electronic device display for displaying a document in accordance with one embodiment of the invention.
FIG. 4 is a schematic view of an illustrative display for printing a document in accordance with one embodiment of the invention.

A user can direct an electronic device to print a document using any suitable approach. In some embodiments, an electronic device application can include a selectable print option or other input interface operation corresponding to a print instruction. FIG. 3 is a schematic view of an illustrative electronic device display for displaying a document in accordance with one embodiment of the invention. In the example of FIG. 3, the document displayed is a photograph captured by the device, although it will be understood the features described in the context of the photograph can be applied to any suitable document. Display 300 can include image 310 captured by a camera of the device using an image capture application. To control the operation of the image capture application, display 300 can include region 320 of options. For example, region 320 can include photos option 321 for viewing previously stored images, capture option 322 for storing a currently captured image, and media type option 323 for selecting to capture a still image or a video. Display 300 can include any other option for controlling the application operations, including for example options in region 320, or in other regions of the display. In some embodiments, options can be selectively displayed, for example as pop-ups.

In some cases, a user may wish to print a captured image. The user can then select a particular previously captured image (e.g., via photos option 321) and direct the device to display a menu providing available operations that the application can perform with the selected captured image.

FIG. 4 is a schematic view of an illustrative display for printing a document in accordance with one embodiment of the invention.

Similar to FIG. 3, although the document displayed is a photograph captured by the device, it will be understood the features described in the context of the photograph can be applied to any suitable document. Display 400 can include image 410 over which menu 420 of options for performing device operations is provided. Menu 420 can be provided using any suitable approach, including for example as a menu extending from a menu bar of the device (not shown). In some embodiments, menu 420 may not overlap the display of image 410.

The electronic device can display any suitable option for performing an operation with the image. For example, menu 420 can include email option 421, print option 422, send to cloud option 423, contact option 424, and wallpaper option 425. In some embodiments, menu 420 can include cancel option 426 if a user decides not to perform any operation with the image. The options shown in menu 420 are illustrative, and any other option can be used instead or in addition to those shown. In addition, the options of menu 420 can include further sub-options or settings that a user can define, for example as part of selecting a menu option (e.g., a toggle option for selecting one of several printers). In some cases, however, the electronic device can provide sub-options in a new display in response to receiving a selection of a particular option of menu 420. In response to receiving a selection of print option 422, the electronic device can provide image 410 to a printer for printing.

Figure 5:
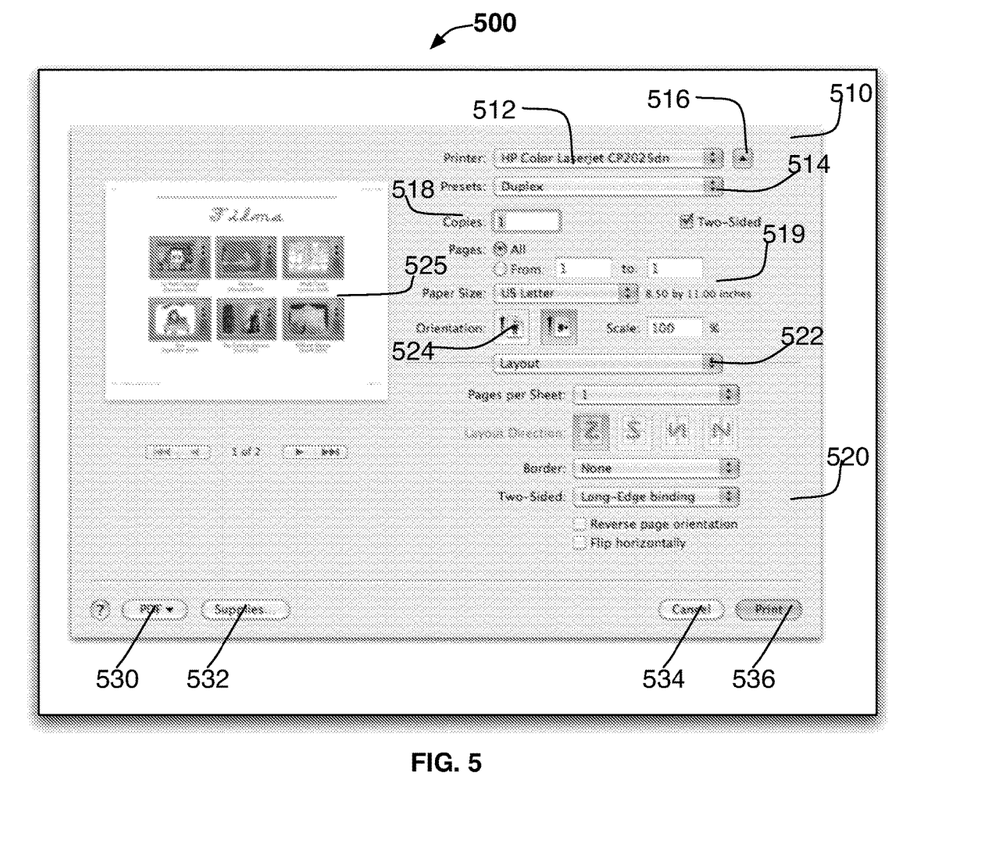
FIG. 5 is a schematic view of an illustrative display for defining print options in accordance using a menu.

In some embodiments, an electronic device can define a multitude of settings as part of a printing process. For example, an electronic device can define one or more of a printer to use, paper orientation, a selection pages to print, collation, two-sided printing, the document layout (pages per sheet or border), color matching, paper size, paper feed, the use of a cover page, stapling, margin shifts, or combinations of these. FIG. 5 is a schematic view of an illustrative display for defining print options using a menu. The electronic device can provide display 500 at any suitable time, including for example in response to receiving an instruction to print a document (e.g., in response to receiving a selection of print option 422, FIG. 4). Display 500 can include printing options displayed using any suitable approach. For example, display 500 can include dialog or pop-up menu 510 having different options for defining a print request. In some cases, display 500 can instead or in addition provide the print options using other approaches, including for example as a full display, as part of a menu, in an overlay, or combinations of these. Pop-up menu 510 can include any suitable option, including for example printer selection option 512, presets option 514, copies option 518, pages option 519, and option 516 for expanding the available options in region 520. In some embodiments, menu 510 can include print orientation option 524. Region 520 can include any suitable subset of options, including for example options related to menu selection 522. Menu selection 522 can be selected from a drop down menu defining several categories of printing sub-options. For example, the available options for menu selection 522 can include options for the printing layout, color handling, paper handling, paper feed, cover page, and scheduler. In response to selecting an option for menu selection 522, the electronic device can display sub-options related to the menu selection.

In the example of FIG. 5, region 520 can include sub-options related to the layout of a document to print. For example, region 520 can include, preview option 525 (which may in some cases not be in region 520), a pages per sheet option, a border option, a two-sided option, and other options. The user can select one or more of the sub-options to define the manner in which a selected document is printed. In some embodiments, display 500 can include option 530 for saving a document as a PDF, supplies option 532, cancel option 534 and print option 536.

In electronic devices having smaller displays or limited user interfaces, however, a user may have difficulty interacting with a complex user interface such as the one shown in FIG. 5. In particular, if the display is small, the entirety of display 500 may not be displayed on the display. Alternatively, the size of the text may be so reduced that a user may have difficulty reading or understanding the text, as well as selecting particular displayed options. Furthermore, expanding the options provided in display 500 to be shown in several successive displays provided by the device (e.g., that the user can cycle through) can be cumbersome for the user, especially if the user rarely changes printing settings. It may be desirable, therefore, to provide an interface by which a user can define a particular print setting without needing to interact with a complex user interface.

Figures 6A, 6B, 7A, 7B:
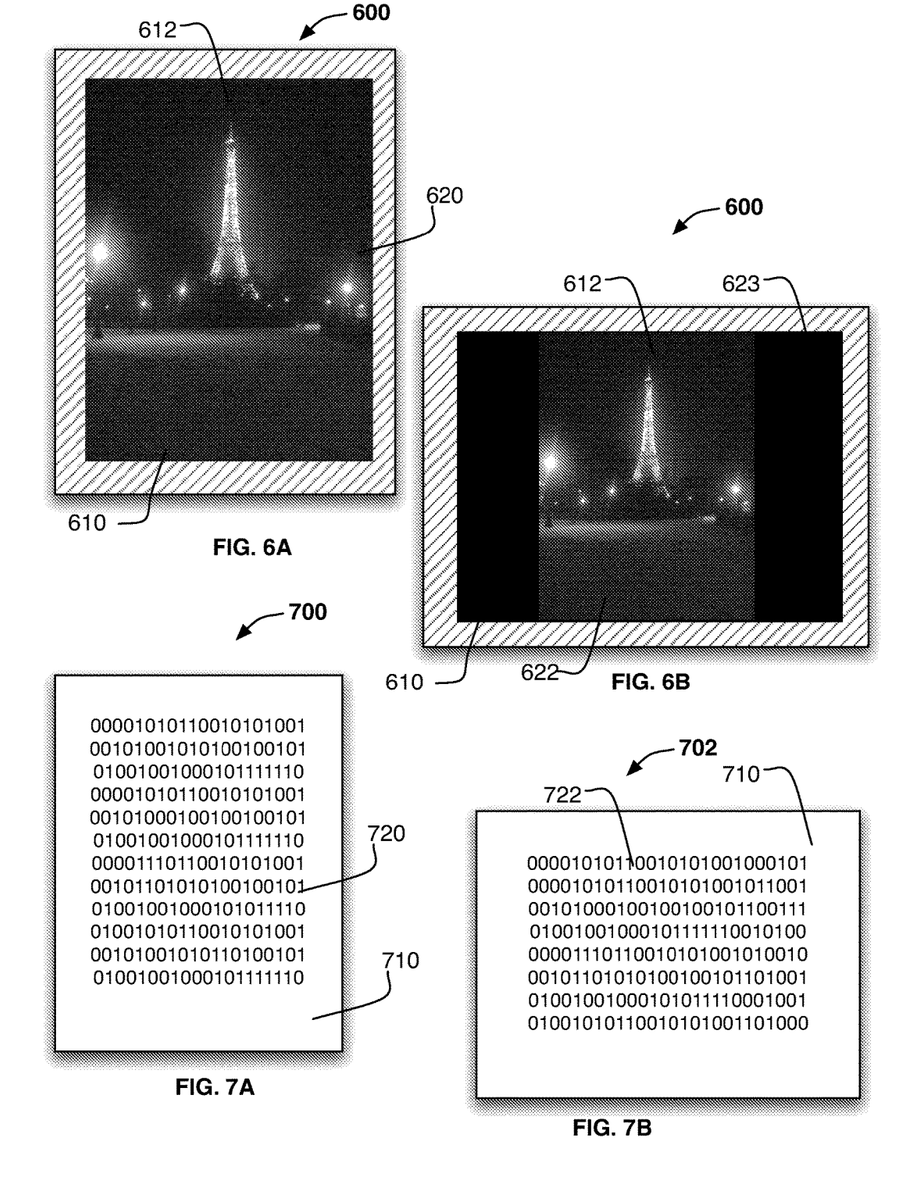
FIGS. 6A and 6B are schematic views of a document displayed by an electronic device in portrait and landscape views in accordance with one embodiment of the invention.
FIGS. 7A and 7B are bitmap representations of a document to print in accordance with one embodiment of the invention.

In one embodiment, the print orientation of a document can be set based on the orientation of the electronic device. FIGS. 6A and 6B are schematic views of a document displayed by an electronic device in portrait and landscape views in accordance with one embodiment of the invention. Electronic device 600 can include display 610 on which a document 612 can be provided (e.g., an image in display 610). Because the display of the electronic device can be elongated (e.g., define a rectangle that includes a long edge and short edge), the document can be displayed in different orientations relative to the display. In particular, document 612 can be displayed in portrait orientation 620 (FIG. 6A) or in landscape orientation 622 (FIG. 6B). Because the size of document 612 may not match the size of the display, the electronic device can display bars 623 around the border of document 612. The electronic device can determine the orientation in which to display a document using any suitable approach. In some embodiments, the orientation of the document can be tied to the orientation of the electronic device. This approach can ensure that the orientation of the document is consistent with the user's position relative to the document (e.g., so that the user is viewing the document right side up).

The electronic device can determine its orientation using any suitable approach. For example, motion detection components within the electronic device can determine the orientation of the device relative to the ground (e.g., relative to a gravity vector). Based on the output of the motion detection component, the electronic device can determine the orientation of the display and adjust the orientation of the document within the display. In the example of FIGS. 6A and 6B, document 612 can rotate relative to display 610 to follow the orientation of the device.

To print document 612, a user can provide a print instruction while the device is displaying document 612. The document, however, can be printed in any orientation on the paper. For example, the document can be printed in landscape view or in portrait view. To provide the desired orientation from the electronic device to a printer system without requiring a particular input using an input interface, the electronic device can direct the printer system to print a representation of document 612 in an orientation that mirrors the orientation of the electronic device. In particular, if document 612 is displayed in a portrait orientation (e.g., as shown in FIG. 6A), the electronic device can direct the printer system to print the document in a portrait orientation. Similarly, if document 612 is displayed in a landscape orientation (e.g., as shown in FIG. 6B), the electronic device can direct the printer system to print the document in a landscape orientation.

The electronic device can provide the orientation information to the printer system using any suitable approach. In some embodiments, document orientation information can be provided as metadata characterizing a print job. For example, the electronic device can provide a representation of the document to print to the printer system, accompanied by specific instructions describing the manner in which the printer system is to operate. The specific instructions can relate, for example, to printing options selected or defined by the user. The electronic device can provide any suitable number or types of instructions. For example, the electronic device can provide instructions corresponding to all of the printer settings. As another example, the electronic device can provide instructions corresponding to settings that are changed from default values (e.g., default values assumed by the printer system).

In some embodiments, however, the orientation information of the document to print can be incorporated in the data describing the document itself. In particular, when the electronic device receives an instruction to print a document, the electronic device can define the representation to send to the printer system based on the currently displayed orientation of the device. The electronic device can provide a representation of a document using any suitable approach. For example, the electronic device can provide information describing a series of glyphs to deposit on the surface of a material. The glyphs can be associated with positioning information to ensure that the glyphs are deposited on the proper areas of the printing material (e.g., paper) to provide an accurate representation of the document. As another example, the electronic device can define individual regions or dots of the printing material (e.g., the paper on which the document is printed) on which ink, toner or another printing substance is to be deposited. In one implementation, the electronic device can define, based on a coordinate system, the specific coordinates of the regions or dots on which the printing substance is to be deposited. Alternatively, the electronic device can define, for each raster line or scan line on which the printer system will provide ink, the segments of the line on which to provide ink, and the color of the ink to provide. In some embodiments, the electronic device can instead or in addition provide information describing the document (e.g., using a page description languages such as PostScript, XML Page Specification, Portable Document Format, Printer Command Language, or unformatted text data), which the printer system can convert to a bitmap of the document using an interpreter (e.g., a raster image processor or RIP). Alternatively, the electronic device can provide information describing the document as an image format (e.g., JPEG, PNG, BMP, GIF, or TIFF). In some embodiments, the electronic device can instead or in addition directly provide a bitmap image of the document to the printer system. Alternatively, the electronic device or the printer system can generate a vector image corresponding to the document to print.

Because the electronic device can provide information identifying specific regions or dots of the printer material on which a printer substance is to be provided (e.g., relative to the paper on which the representation is to be printed), the electronic device inherently sends the document information in a particular orientation. FIGS. 7A and 7B are bitmap representations of a document to print in accordance with one embodiment of the invention. Representations 700 and 702 correspond to document 612 in portrait orientation 620 and landscape orientation 622 (FIG. 6), respectively. Each representation can include bitmap 720 and 722 placed on printer material 710 (e.g., paper). To illustrate the manner in which the electronic device provides orientation information to the printer system, as shown in FIG. 7A, bitmap 720 is oriented in the same manner as document 612 in FIG. 6A (e.g., portrait orientation). Similarly, in FIG. 7B, bitmap 722 is oriented in the same manner as document 612 in FIG. 6B (e.g., portrait orientation). In particular, in FIG. 7B bitmap 722 is rotated relative to printer material 710, and not simply a rotation of the combination printer material 710 and bitmap 710 (which would simply represent a portrait orientation printout of document 612 but held sideways, as a landscape). In other words, the actually page orientation of the document can be changed for the print job based on the orientation of the device (as opposed to retaining an original page orientation of the document, and providing an instruction specifying a particular orientation in which to print).

Accordingly, using the approach described in FIGS. 6A-7B, an electronic device can direct a printer system to print a document in portrait or landscape orientation by providing the data representing the document to be printed in a manner corresponding to the portrait or landscape representation of the document on the device. This approach may further reduce the processing required by the printer system and by the device, as less data may need to be transmitted to describe the printing job (e.g., additional information describing the orientation in which to print is unnecessary). In addition, a less sophisticated printer system (e.g., a system that can only print in a single orientation and does not process metadata) can correctly print the provided document. Using the received information, the printer system can provide a printout of the document in the orientation corresponding to the device orientation.

Figure 8:
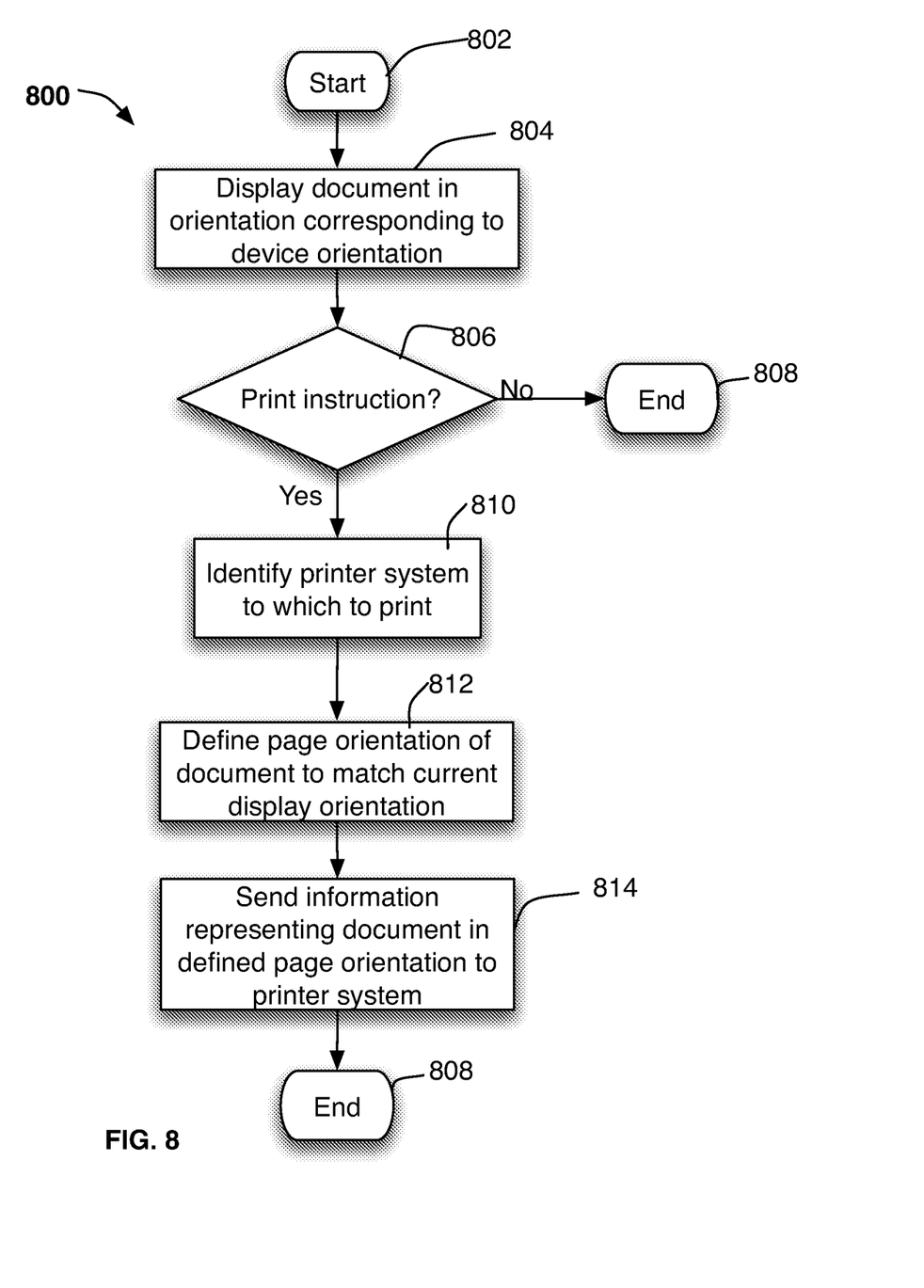
FIG. 8 is a flow chart of an illustrative process for directing a printer system to print a document in a particular orientation in accordance with one embodiment of the invention.

FIG. 8 is a flow chart of an illustrative process for directing a printer system to print a document in a particular orientation in accordance with one embodiment of the invention. Process 800 can begin at step 802. At step 804, an electronic device can display a document in an orientation corresponding to the device orientation. For example, an electronic device can determine its current orientation using one or more motion sensing components, and rotate documents displayed by the device to reflect the device orientation. In particular, if the device display (e.g., a rectangular display) is in a portrait orientation, a displayed document can be rotated so that it is in the same portrait orientation. This may allow a user to read or understand documents no matter the orientation of the device.

At step 806, the electronic device can determine whether a print request was received. For example, the electronic device can determine whether the user selected a print option overlaid on the displayed document. If the electronic device determines that no print option was selected, process 800 can move to step 808 and end. If, at step 806, the electronic device instead determines that a print option was selected, process 800 can move to step 810. At step 810, the electronic device can identify a particular printer system to which to print the document. For example, the electronic device can select a default printer. As another example, the electronic device can select a printer identified by the user. If only a single printer is available, or only a single printer has been identified to the electronic device, process 800 can automatically select the single printer and skip step 810.

At step 812, the electronic device can define the page orientation of the document (e.g., the orientation of the document relative to the printer material of the printer system on which the representation of the document will be printed) to match the current display orientation of the device. For example, the electronic device can set a page orientation variable of the document to match the orientation of the device. As another example, the electronic device can define the page orientation of the document with respect to the printing job to match the orientation of the device. At step 814, the electronic device can send information representing the document in the defined page orientation to the printer system. For example, the electronic device can define a representation of the document in a page description language in which the content of the document is oriented on a page in a manner corresponding to the device orientation. The electronic device may not send any information or metadata that relates to a desired printing orientation in addition to the information representing the document. Process 800 can then end at step 808.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation.

What is claimed is:

1. A method comprising:
    presenting, by an electronic device, a document on a display of the electronic device;
    determining, by the electronic device, a current orientation of the electronic device;
    determining, by the electronic device, a first device orientation corresponding to the current orientation of an electronic device;
    receiving, by the electronic device, print request to print the document;
    setting, by the electronic device, a page orientation printer setting of the document based on the first device orientation; and
    transmitting, by the electronic device, the page orientation printer setting of the document to a printer system to print the document according to the page orientation printer setting.

2. The method of claim 1, further comprising:
    detecting that the current orientation of the electronic device has changed;

determining a second device orientation corresponding to the current orientation of the electronic device, where the second device orientation is different than the first device orientation; and changing the page orientation printer setting of the document based on the second device orientation.

3. The method of claim 1, wherein:

determining the current orientation of the electronic device further comprises analyzing the output of a motion sensing component of the device.

4. The method of claim 1, further comprising:

presenting the document on the display of the electronic device according to the determined device orientation; and defining a page orientation of the document to match the orientation in which the document is presented.

5. The method of claim 1, wherein:

the determined current orientation comprises at least one of a portrait orientation and a landscape orientation.

6. The method of claim 1, further comprising:

defining a representation of the document in a page description language, wherein the page orientation printer setting of the document in the representation corresponds to the determined device orientation.

7. The method of claim 1, farther comprising;

defining a representation of the document in a page description language, wherein defining the representation further comprises defining the representation of the document according to the defined page orientation.

8. A non-transitory computer-readable media comprising instructions for defining the orientation in which a document is printed, which when executed by a computer, cause the computer to perform the operations of:

presenting, by an electronic device, a document on a display of the electronic device;

determining, by the electronic device, a current orientation of the electronic device;

determining, by the electronic device, a first device orientation corresponding to the current orientation of an electronic device;

receiving, by the electronic device, a print request to print the document;

setting, by the electronic device, a page orientation printer setting of the document based on the first device orientation; and transmitting, by the electronic device, the page orientation printer setting of the document to a printer system to print the document according to the page orientation printer setting.

9. The non-transitory computer-readable media of claim 8, comprising further computer readable instructions recorded thereon for:

detecting that the current orientation of the electronic device has changed;

determining a second device orientation corresponding to the current orientation of the electronic device, where the second device orientation is different than the first device orientation; and changing the page orientation printer setting of the document based on the second device orientation.

10. The non-transitory computer-readable media of claim 8, wherein:

determining the current orientation of the electronic device further comprises analyzing the output of a motion sensing component of the device.

11. The non-transitory computer-readable media of claim 8, further comprising:

presenting the document on the display of the electronic device according to the determined device orientation; and defining a page orientation of the document to match the orientation in which the document is presented.

12. The non-transitory computer-readable media of claim 8, wherein:

the determined current orientation comprises at least one of a portrait orientation and a landscape orientation.

13. The non-transitory computer-readable media of claim 1, further comprising:

defining a representation of the document in a page description language, wherein the page orientation printer setting of the document in the representation corresponds to the determined device orientation.

14. The non-transitory computer-readable media of claim 8, further comprising:

defining a representation of the document in a page description language, wherein defining the representation further comprises defining the representation of the document according to the defined page orientation.

15. An electronic device for printing documents, comprising: an input interface;

a display viewable in a landscape orientation and in a portrait orientation;

input/output circuitry operative to establish a communications path with a printer system; and control circuitry operative to:

present, by an electronic device, a document on a display of the electronic device;

determine by the electronic device, a current orientation of the electronic device;

determine, by the electronic device, a first device orientation corresponding to the current orientation of an electronic device;

receive, by the electronic device, a print request to print the document;

set, by the electronic device, a page orientation printer setting of the document based on the first device orientation; and transmit, by the electronic device, the page orientation printer setting of the document to a printer system to print the document according to the page orientation printer setting.

16. The electronic device of claim 15, wherein the communications path comprises one of:

a wired communications path;

a wireless communications path; and a combination of a wired and a wireless communication path.

17. The electronic device of claim 15, wherein the control circuitry is further operative to:

direct the printer system to define a bitmap of the document using a raster image processor.

18. The electronic device of claim 15, wherein:

the electronic device further comprises motion sensing circuitry operative to provide an output indicating the orientation of the display.

* * * * *

UNITED STATES PATENT AND TRADEMARK OFFICE
CERTIFICATE OF CORRECTION

PATENT NO. : 9,959,490 B2  
APPLICATION NO. : 15/470838  
DATED : May 1, 2018  
INVENTOR(S) : David Gelphman Page 1 of 1

It is certified that error appears in the above-identified patent and that said Letters Patent is hereby corrected as shown below:

Column 12, Line 16:
Replace "1, further comprising:" with -- 8, further comprising: --

Signed and Sealed this
Eighteenth Day of September, 2018

Andrei Iancu
*Director of the United States Patent and Trademark Office*